US007487019B2

United States Patent
Estes et al.

(10) Patent No.: US 7,487,019 B2
(45) Date of Patent: Feb. 3, 2009

(54) INTELLIGENT VEHICLE FLEET SYSTEMS AND METHODS

(75) Inventors: Jacquelynn Estes, Warrenton, VA (US); William Wayne Corey, Chantilly, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 10/956,212

(22) Filed: Sep. 30, 2004

(65) Prior Publication Data

US 2005/0222723 A1    Oct. 6, 2005

Related U.S. Application Data

(60) Provisional application No. 60/528,795, filed on Dec. 12, 2003.

(51) Int. Cl.
*G01M 17/00* (2006.01)
(52) U.S. Cl. .............. 701/33; 701/29; 701/36; 701/30; 340/438; 340/426.19
(58) Field of Classification Search .......... 701/25, 701/29, 33, 36, 30; 340/425.5, 438, 439, 340/426.18, 426.19
See application file for complete search history.

(56) References Cited

U.S. PATENT DOCUMENTS 5,640,002 A * 6/1997 Ruppert et al. ......... 235/462.46
5,844,473 A * 12/1998 Kaman ..................... 340/439
7,034,683 B2 * 4/2006 Ghazarian ................ 340/568.1
2002/0059075 A1   5/2002 Schick et al.

OTHER PUBLICATIONS

PCT International Search Report and Written Opinion of the International Searching Authority in PCT Application No. PCT/US04/31943, dated Nov. 14, 2006 (8 pages).
Peoplenet Metro, Wireless Feet System, Sep. 2002, 12 pages.
XATA Brochure, 2002, 8 pages.
Sven A. Wehrwein, "Full Speed Ahead," Twin Cities Business Monthly, May 2004 (4 pages).
XATA, "Driving Results—A Case Study, " 2 pages.
XATA Fleet Management System, 18 pages.

* cited by examiner

*Primary Examiner*—Gertrude Arthur Jeanglaud
(74) *Attorney, Agent, or Firm*—Finnegan, Henderson, Farabow, Garrett & Dunner, LLP

(57) ABSTRACT

Methods and systems for intelligent vehicle fleets are disclosed. An intelligent vehicle may function as a mobile office reducing the need for users to perform work functions in a brick-and-mortar building. Methods or systems consistent with the invention may manage vehicle fleets, or provide intelligent vehicle subsystems, or acquire address information using an intelligent vehicle. A method to manage vehicle fleets may include receiving at a remote computer communicated maintenance data from information collection devices installed in the intelligent vehicle.

22 Claims, 14 Drawing Sheets

| Vehicle ID | Tire Pressure | Engine Information | Vehicle Fluid Information | Maintenance Schedule |
|---|---|---|---|---|
| 1 | LF=35 psi RF=34 psi | Flywheel Knock | Engine Oil = Low | Oil Lube Service due - 1/1/04 |
| 2 | RR=40 psi | — | Steering Fluid = Low | 5 yr. service due - 1/1/04 |
| 3 | — | Cylinders Out of Balance | — | — |
| 4 | LF=36 psi | Cylinders Out of Balance | — | — |
| 5 | RF=30 psi | — | Washer Fluid = Low | Tire Service due - 1/1/04 |

FIG. 8

| Vehicle ID | Employee ID | Date | Begin Time | End Time | Route |
|---|---|---|---|---|---|
| 1 | 100 | 1/1/04 | 9:00 AM | 5:00 PM | XYZ |
| 2 | 101 | 1/2/04 | 7:00 AM | 2:00 PM | PQR |
| 3 | 102 | 1/3/04 | 8:00 AM | 4:00 PM | LMN |
| 4 | 103 | 1/1/04 | 10:00 AM | 6:00 PM | CDE |

FIG. 9

| Location ID | Street Address | Location Information | Zip Code | City | RFID Tag |
|---|---|---|---|---|---|
| 1 | 100 King St. | Latitude = 40° 01' 9" W<br>Longitude = 60°05' 2" N | 20000 | ABC | 001 |
| 2 | 700 Queen St. | Latitude = 30° 02' 3" E<br>Longitude = 50° 10' 4" W | 20010 | XYZ | 002 |
| 3 | 5010 Princess Ln. | Latitude = 130° 25' 1" W<br>Longitude = 180° 10' 1" S | 30010 | P2R | 003 |
| 4 | 1010 Prince Blvd. | Latitude = 45° 20' 19" E<br>Longitude = 60° 11' 10" W | 50010 | STP | 004 |

INTELLIGENT VEHICLE FLEET SYSTEMS AND METHODS

CROSS REFERENCE TO RELATED APPLICATION

This application claims the benefit of priority under 35 U.S.C. § 119 of U.S. Provisional Application No. 60/528,795, filed on Dec. 12, 2003, and which is expressly incorporated herein by reference.

DESCRIPTION OF THE INVENTION

1. Technical Field

The invention relates to intelligent systems, and more particularly, to intelligent vehicle fleet systems and methods.

2. Background

Large vehicle fleets, such as the mail carrier vehicles used by the US Postal Service, an independent establishment of the U.S. government which provides delivery services, cover vast geographic areas every day. Traditionally, users of such vehicles, for example, mail carriers, have relied on a brick-and-mortar office building to perform various administrative and other work-related tasks. For example, a mail carrier may come to a central facility at the start of her workday and obtain her vehicle keys, pick up the mail to be delivered on that day, get her route information, and receive any other instructions from the central facility. Next, the mail carrier may go to a parking lot located next to the central facility, and load her mail onto the vehicle, and then start delivering mail. Such conventional work flow for mail or package delivery personnel requires expensive brick-and-mortar office resources to effectively serve the delivery personnel.

Additionally, because mail carrier vehicles have not been equipped with intelligent vehicle subsystems, mail carrier vehicles have not been leveraged to provide additional services.

In sum, current large vehicle fleets lack systems and methods for effective use of such fleets in providing effective work flow management and for effective exploitation of intelligence, which may be embedded in such vehicle fleets. Accordingly, there is a need for effective intelligent vehicle fleet systems and methods.

SUMMARY OF THE INVENTION

Consistent with the invention, intelligent vehicle fleet systems and methods are provided. In one embodiment, a method for managing vehicle fleets is provided. The method may include receiving at least a portion of maintenance information acquired at at least one vehicle using at least one device associated with at least some of the at least one vehicles. The method may further include monitoring the at least one vehicle based on at least a portion of the acquired maintenance information.

In another embodiment, an intelligent vehicle subsystem for a vehicle is provided. The intelligent vehicle subsystem may include a device configured to scan information coded on items to be delivered. The intelligent vehicle subsystem may further include a tag reader configured to read information contained in tags associated with containers for storing items to be delivered. The intelligent vehicle subsystem may further include a global positioning sensor configured to determine the location of the vehicle. The intelligent vehicle subsystem may further include a user terminal configured to communicate with a remote computer at least one of the information coded on the items to be delivered, information contained in tags associated with containers for storing items to be delivered, and a location of the vehicle.

In yet another embodiment, a method for acquiring address information using a vehicle is provided. The method may include receiving address information corresponding to a location identifiable by location information. The method may further include storing the address information corresponding to the location in at least one database.

In yet another embodiment, a system for intelligent delivery vehicles is provided. The system may include one or more delivery vehicles. The system may also include a device configured to scan information coded on items to be delivered. The system may further include a tag reader configured to read information contained in tags associated with containers for storing items to be delivered. The system may further include a global positioning sensor configured to determine the location of the one or more delivery vehicles. The system may further include a user terminal configured to communicate with a remote computer at least one of the information coded on the items to be delivered, information contained in tags associated with containers for storing items to be delivered, and a location of the one or more delivery vehicles.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

In the drawings:

FIG. 8 shows a block diagram of an exemplary maintenance information table, consistent with the systems and methods of the present invention;

FIG. 9 shows a block diagram of an exemplary operator management table, consistent with the systems and methods of the present invention;

FIG. 10 shows a block diagram of an exemplary vehicle fleet leverage table, consistent with the systems and methods of the present invention;

DETAILED DESCRIPTION

Figure 1:
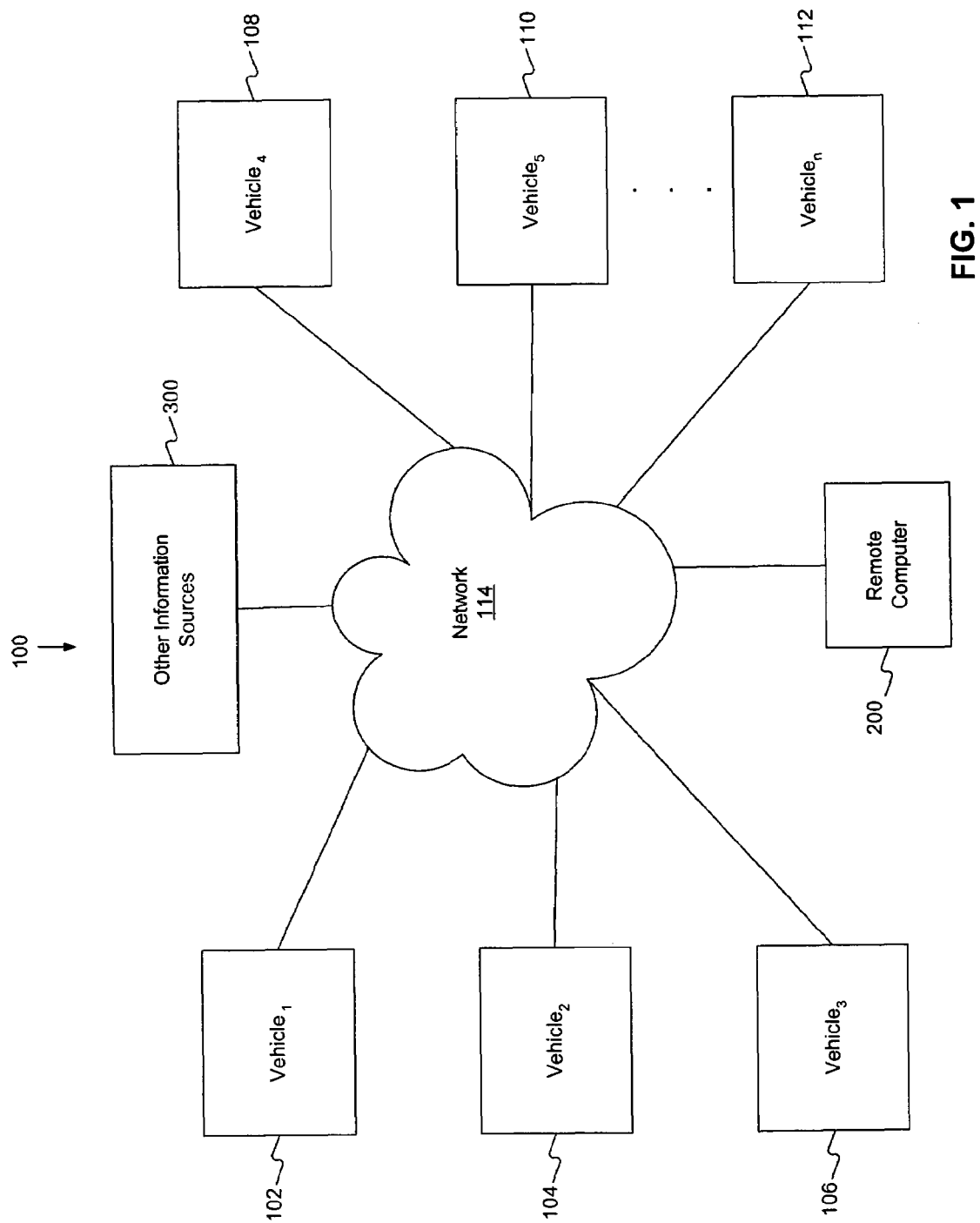
FIG. 1 is a block diagram illustrating an exemplary system environment for intelligent vehicle fleet systems and methods, consistent with systems and methods of the present invention.

Reference will now be made in detail to the present embodiments (exemplary embodiments) of the invention, examples of which are illustrated in the accompanying drawings. Wherever possible, the same reference numbers will be used throughout the drawings to refer to the same or like parts.

The disclosed system environment preferably includes a plurality of intelligent vehicles connected via a network, such as a wide area network and/or the Internet, to each other and to other resources, such as a remote computer. Further, in one embodiment, the vehicles may provide office functionality, which has been typically provided by brick-and-mortar facilities. As part of this process, the vehicle users may drive by a control kiosk, which may, in conjunction with an intelligent system in the vehicle, provide various functions, such as item dispensing and collection, information dispensing and collection, and security and quality assurance services.

Moreover, in one embodiment, the vehicle fleet may be more efficiently maintained by automating much of the maintenance information acquisition and scheduling. Further, in another embodiment, the vehicle fleet may be leveraged to provide other value added services.

Examples of vehicles in which embodiments of the present invention may be implemented include delivery vehicles such as the long life vehicle (LLV), the flexible fuel vehicle (FFV), one and two ton trucks, trailer trucks, the G3, and others that may be used by parcel delivery service providers. However, the vehicles are not limited to such exemplary vehicles.

The features of the present invention may be implemented in various system or network environments to provide automated computational tools to facilitate intelligent vehicle fleet systems and methods. Such environments and applications may be specially constructed for performing the various processes and operations of the invention or they may include a general-purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general-purpose computers may be used with programs written in accordance with teachings of the invention, or it may be more convenient to construct a specialized apparatus or system to perform the required methods and techniques. The present invention also relates to computer-readable media that include program instruction or program code for performing various computer-implemented operations based on the methods and processes of the invention. The media and program instructions may be those specially designed and constructed for the purposes of the invention, or they may be of the kind well known and available to those having skill in the computer software arts. Examples of program instructions include both machine code, such as produced by compiler, and files containing a high level code that can be executed by the computer using an interpreter.

FIG. 1 illustrates an exemplary system environment 100 for systems and methods consistent with the present invention. An intelligent vehicle$_1$ 102, an intelligent vehicle$_2$ 104, an intelligent vehicle$_3$ 106, an intelligent vehicle$_4$ 108, an intelligent vehicle$_5$ 110, and an intelligent vehicle$_n$ 112 may share information via a network 114. One skilled in the art will appreciate that any number of intelligent vehicles may be connected via any number of networks to each other in any configuration. Examples of networks that may be used to exchange information among the various components of FIG. 1 include networks such as the Internet, telephony networks, private networks, virtual private networks, local area networks, metropolitan area networks, wide area networks, ad hoc networks, state networks, frame-relay networks, or any other mechanism for permitting communication between remote sites, regardless of whether the connection is wired or wireless. Thus, the present invention can be used in any environment where information may be exchanged by any means among the various components, including, for example the intelligent vehicle subsystems in the vehicles and any remote computers. Thus, for example, intelligent vehicles connected to network 114 may communicate, using network 114, with a remote computer 200 and/or other information sources 300. In one embodiment, remote computer 200 may be located at a facility for managing the vehicles. Other information sources 300 may include various databases, such as, for example, global positioning systems and address databases.

Figure 2:
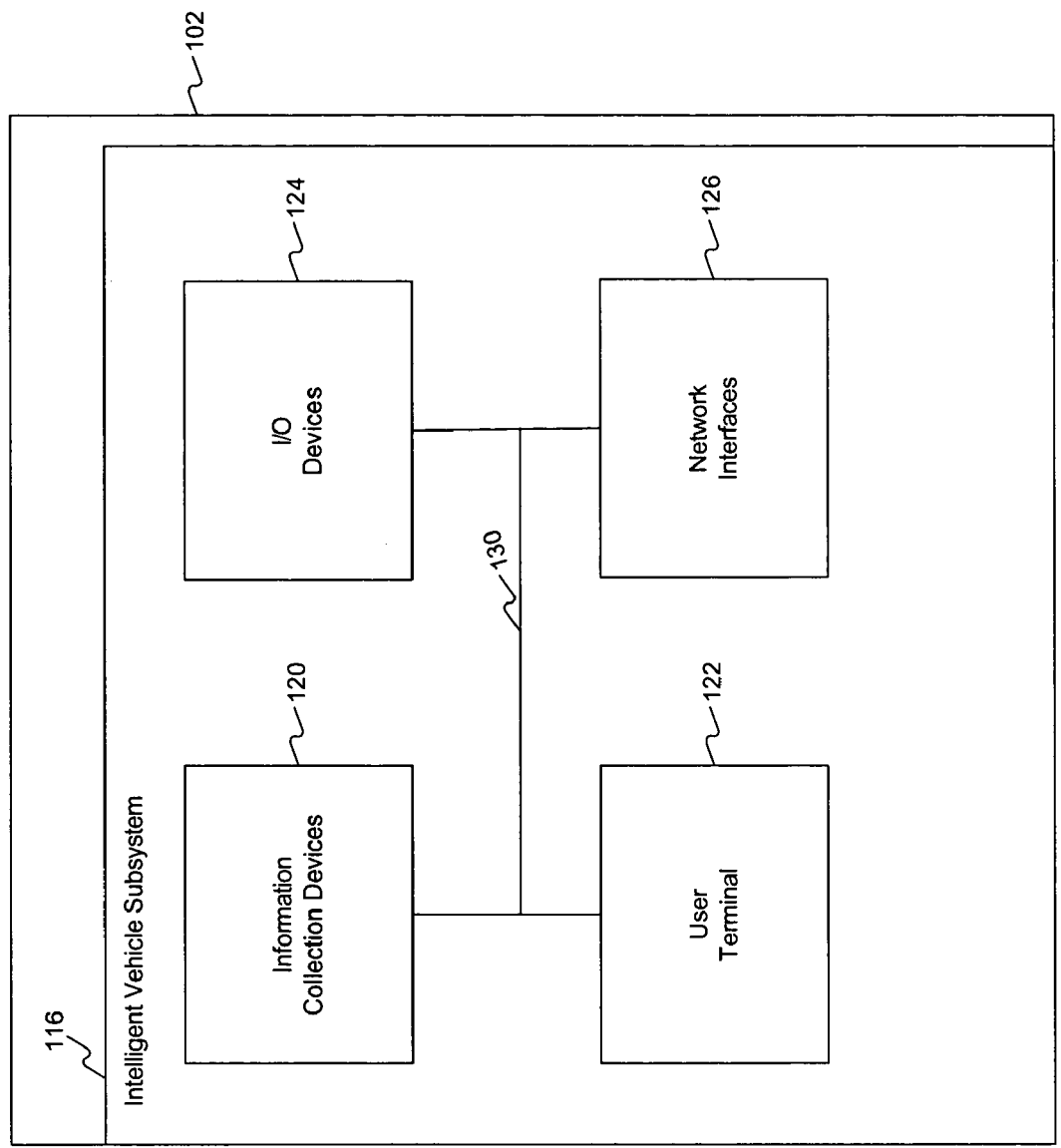
FIG. 2 is a block diagram illustrating a vehicle with an exemplary intelligent vehicle subsystem, consistent with systems and methods of the present invention.

Referring now to FIG. 2, an exemplary intelligent vehicle, such as vehicle$_1$ 102 may include an intelligent vehicle subsystem 116, including information collection devices 120, a user terminal 122, I/O devices 124, and network interfaces 126, connected via at least one information link 130. One skilled in the art will appreciate that intelligent vehicle subsystem 116 may include additional or fewer components. Additionally, the various components of the intelligent vehicle subsystem may be connected in any fashion using wired or wireless connections. Although not shown in FIG. 2, each of these components may further have an infrared IR port to communicate with each other. Further, other types of technology such as Bluetooth, IEEE 802.11, or any other appropriate communication protocol or standard may be used to establish a communication link between a user terminal 122 and the other components of intelligent vehicle subsystem 116.

Figure 3:
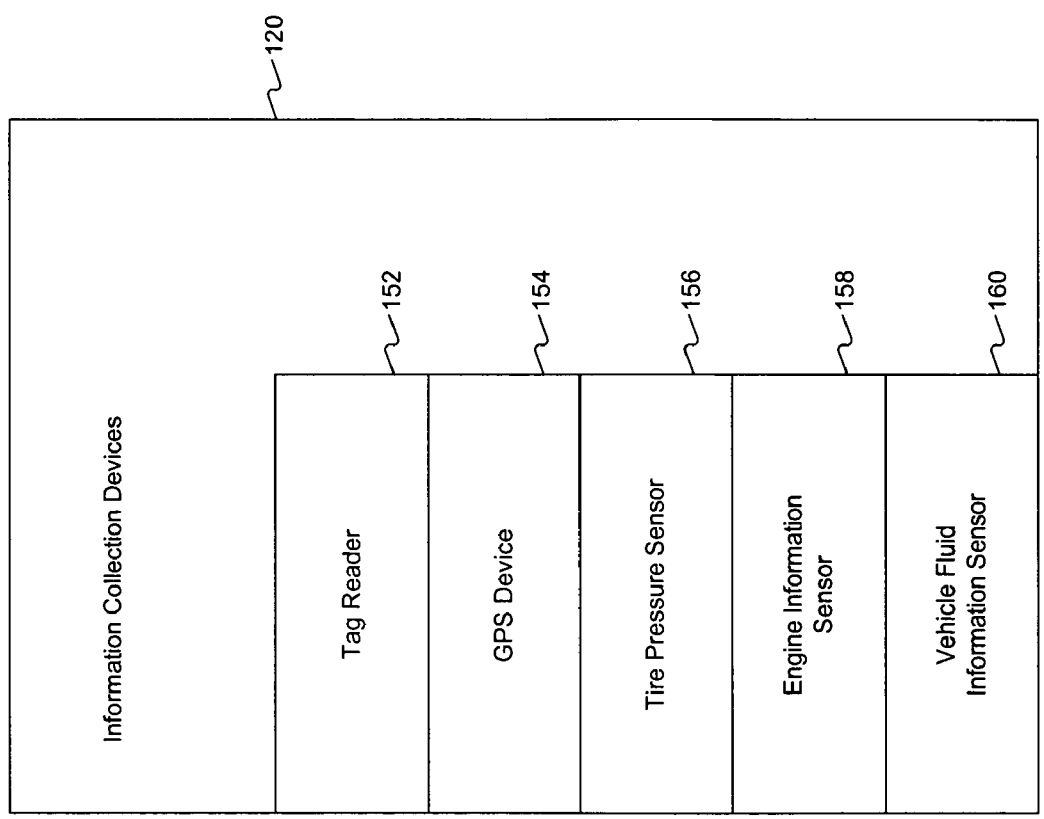
FIG. 3 shows a block diagram illustrating exemplary information collection devices that may be used, consistent with systems and methods of the present invention.

Referring now to FIG. 3, exemplary information collection devices 120 are shown that may be used consistent with systems and methods of the present invention. Information collection devices 120 may include, for example, a tag reader 152, global position satellite (GPS) device 154, or vehicle component status sensors, such as, a tire pressure sensor 156, an engine information sensor 158, and a vehicle fluid information sensor 160. The sensors and devices shown in FIG. 3 are merely exemplary and additional or fewer devices/sensors may be used consistent with the systems and methods of the present invention. For example, in one embodiment a video camera and a scanner (such as a mail scanner) may also be used as information collection devices.

In one embodiment, tag reader 152 may be an RFID tag reader, which may read information contained in or on RFID tags. By way of non-limiting examples, tag readers available from Identec of British Columbia, Canada, and/or Alien Technology of Morgan Hill, Calif. may be used. A container for storing items to be delivered, such as, for example, mail and parcels, may be identified by attaching an active or a retro-reflective radio frequency identification (RFID) tag to it. By way of non-limiting examples, both active RFID tags, such as the ones provided by Identec of British Columbia, Canada, and retro-reflective tags, such as the ones provided by Alien Technology of Morgan Hill, Calif. may be used. Of course, other suitable tagging technologies that may emit signals having a similar range to RFID tags may also be used.

In one embodiment, GPS device 154 may receive signals from satellites to obtain its coordinates, such as its latitude and longitude. In one embodiment, GPS receivers/antennas from Trimble Navigation of Sunnyvale, Calif. may be used. Alternatively and/or additionally GPS receivers available from Garmin Ltd. of Olathe, Kans. may be used.

In one embodiment, a vehicle component status sensor, such as tire pressure sensor 156, may determine, for example, whether a particular tire is under inflated or over inflated. In one embodiment, tire pressure sensors made by Royal Phillips Electronics of the Netherlands may be used. In one embodiment, tire pressure sensor 156 may transmit vehicle component status data, tire pressure data in particular, using an antenna (mounted in the wheel well, for example) to a key-less entry receiver mounted on the vehicle, which may be modified to receive signals from the antenna connected to tire pressure sensor 156.

In one embodiment, a vehicle component status sensor, such as engine information sensor 158 may be a knock sensor to detect whether the engine is knocking. Knock sensors may be obtained from any of the manufacturers of such sensors, including, for example, NGK Spark Plug Co., Ltd. of Japan. Engine information sensor 158 may include several different sensors that may be used to obtain status data concerning various aspects of the engine operation, such as engine temperature or the air to fuel ratio. In one embodiment, such sensors may be specific to the engine manufacturer at issue. Moreover, these sensors may transmit vehicle component status data, regarding the engine using an antenna to the key-less entry receiver discussed above.

In one embodiment, a vehicle component status sensor, such as vehicle fluid information sensor 160, may provide status data concerning the level or viscosity of a particular fluid, such as engine oil. Vehicle fluid information sensor 160 may be a collection of sensors that may monitor various fluids, such as steering oil, brake oil, washer fluid, and/or other vehicle fluids. In one embodiment, fluid sensors available from Honeywell, Inc. of Morristown, N.J. may be used. Additionally, these sensors may transmit vehicle component status data regarding the vehicle fluid using an antenna to the key-less entry receiver discussed above. One skilled in the art will appreciate that data obtained from the sensors may be received by the key-less entry receiver and then transmitted to user terminal 122 or another on-board computer.

Figure 4:
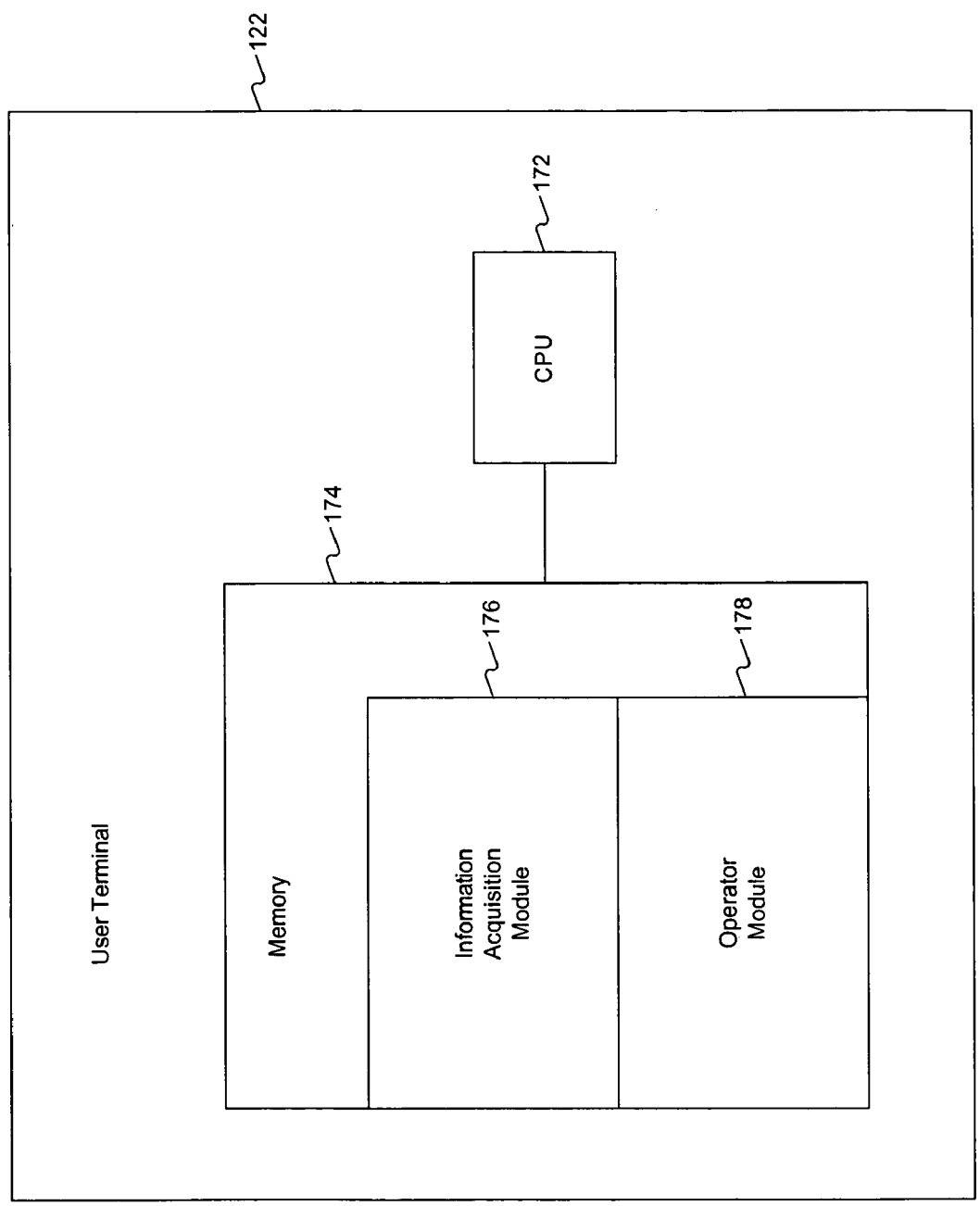
FIG. 4 shows a block diagram for an exemplary user terminal, consistent with the systems and methods of the present invention.

Referring now to FIG. 4, an exemplary user terminal 122 consistent with the systems and methods of the present invention is shown in block diagram form. User terminal 122 may be any appropriate type of a user terminal, such as, for example, a user computer executing a web browser-type program, such as Microsoft's Internet Explorer or Netscape Navigator. Accordingly, user terminal 122 may include a processor, memory, storage, and an interface for connecting to network 114. In an exemplary embodiment, a user, such as a mail carrier or other delivery personnel, using user terminal 122 with a web browser type program, may connect via network 114 to remote computer 200. After logging into remote computer 200, the user may then navigate through the web pages to the desired functionality (e.g., accessing work schedule and mail route). For example, a user may select to connect to network 114 using a web browser to enter a Uniform Resource Locator (URL) identifying remote computer 200 (e.g., www.usps.com).

Referring now to FIG. 4, an exemplary user terminal 122 is shown which may include a CPU 172 and a memory 174. One skilled in the art will appreciate that user terminal 122 may include additional processors and/or memory. Memory 174 may include an information acquisition module 176 and an operator module 178 which, when executed by CPU 172, may provide at least some of the functionality corresponding to user terminal 122. In one embodiment, information acquisition module 176 may interface with various information collection devices 120. Thus, for example, information acquisition module 176 alone or in combination with other components, such as drivers associated with various sensors, may provide various functionality needed for proper acquisition of data using information collection devices 176. For example, information acquisition module may help calibrate the various information collection devices. Operator module 178, alone or in combination with other software components, such as an operating system associated with user terminal 122, may provide an user, such as a mail carrier or other delivery personnel, access to various applications. Such applications may include software allowing the user to access time and attendance information, which may be located on remote computer 200 or on persistent storage (not shown) associated with user terminal 122.

Figure 5:
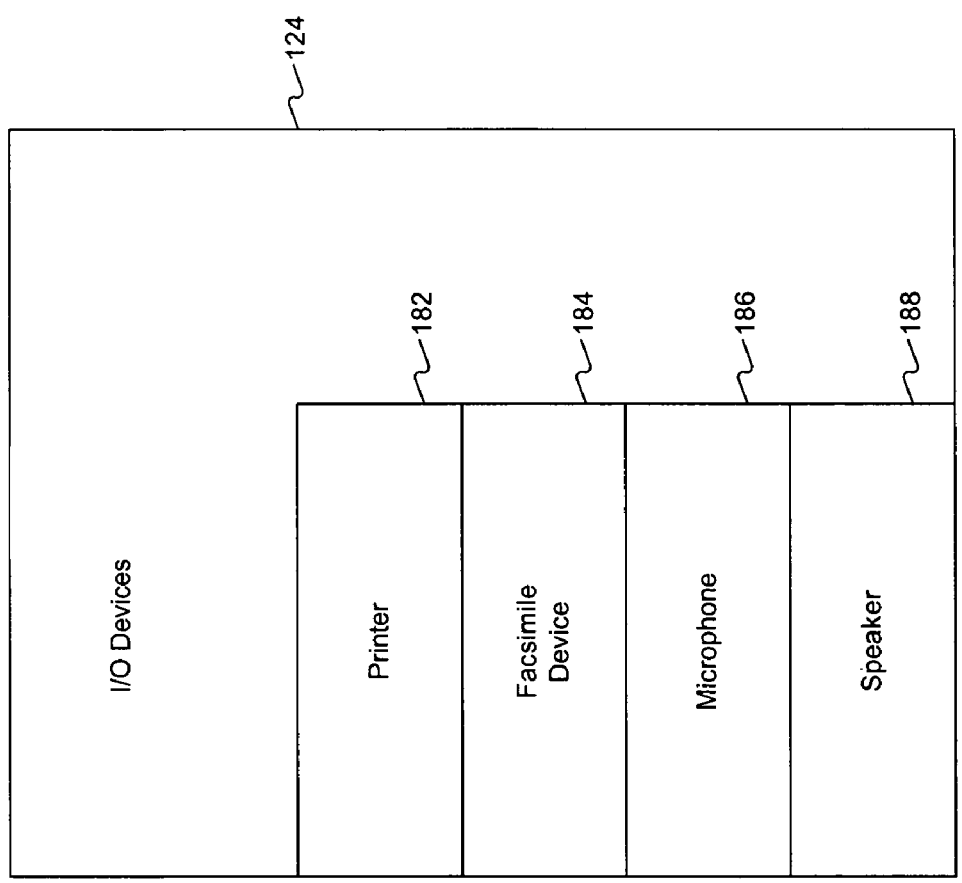
FIG. 5 shows a block diagram illustrating exemplary I/O devices that may be used, consistent with systems and methods of the present invention.

I/O devices 124 may include various input/output devices that may be associated with user terminal 122 and other intelligent devices in a vehicle, permitting the operator of the vehicle to input or output various information. By way of non-limiting examples, as shown in FIG. 5, such I/O devices 124 may include a printer 182, a facsimile device 184, a microphone 186, and a speaker 188. One skilled in the art will appreciate that I/O devices 124 may include additional or fewer devices. Further, although not shown, user terminal 122 may include all relevant modules, such as a voice recognition software module to provide functionality, such as voice recognition, when used with microphone 186. In one embodiment, such voice recognition software may be tailored to specifically recognize various commands associated with an user, such as a mail carrier or other delivery personnel. Such voice commands may relate, for example, to commands necessary for accessing/uploading time/attendance information. Further, in one embodiment, using voice recognition and pattern matching techniques, user terminal 122 in a vehicle may determine the identity of an user of the vehicle. For example, when the user issues a command, such as "recognize Joe Smith," user terminal 122 may authenticate the user by voice authentication. One skilled in the art will appreciate that other technologies, such as iris identification, finger-print identification, or other such technologies may also be used to identify and authenticate the user of the vehicle.

Figure 6:
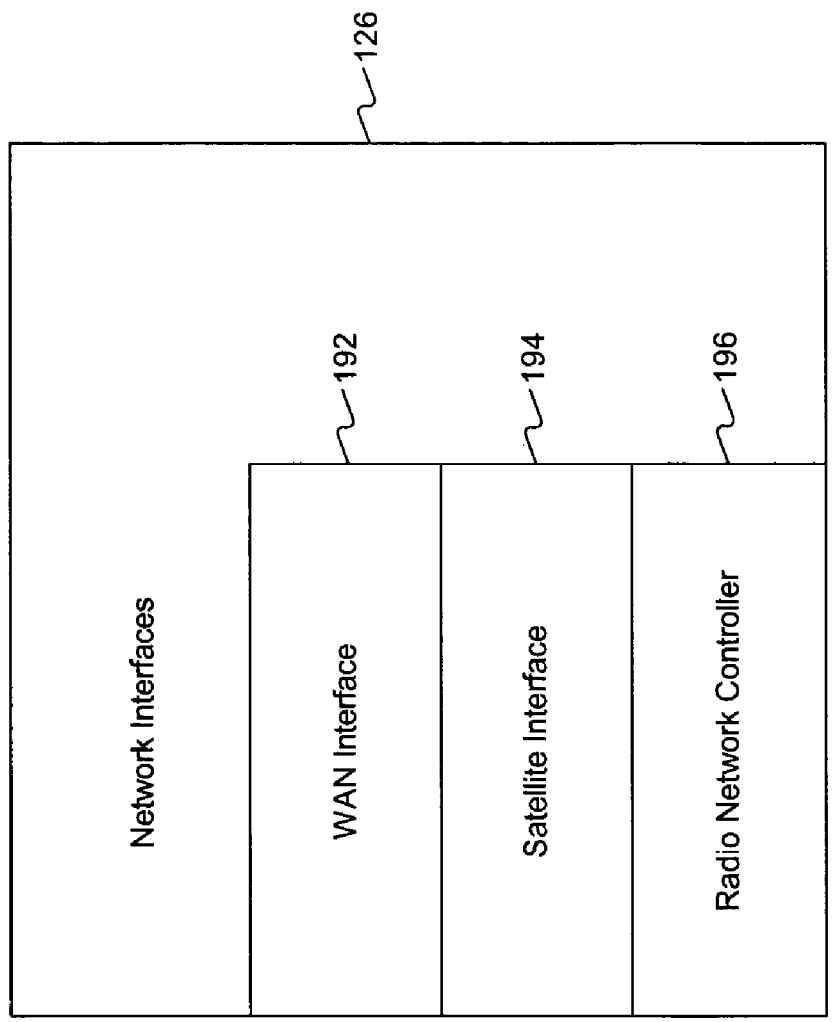
FIG. 6 shows a block diagram illustrating exemplary network interfaces that may be used, consistent with systems and methods of the present invention.

Referring now to FIG. 6, in one embodiment, intelligent vehicle subsystem 116 may further include various network interfaces 126 permitting intelligent vehicle subsystem 116 the ability to communicate with network 114 and/or other networks, systems, or devices. By way of non-limiting examples, network interfaces 126 may include a wide area network (WAN) interface 192, a satellite interface 194, and a radio network controller 196. Using WAN interface 192, an user of a vehicle may employ user terminal 122 to communicate with remote computer 200 or user terminals located in other vehicles. Using satellite interface 194, information, such as GPS data, may be transmitted from the vehicle to a satellite and vice versa. Further, using radio network controller 196, user terminal 122 may interface with a radio frequency (RF) network, for example the Motorola RF network. One skilled in the art will appreciate that the intelligent vehicle subsystem may include other network interfaces enabling various devices/sensors and/or user terminal 122 to communicate with other systems, such as remote computer 200. Thus, for example, in one embodiment user terminal 122 may be a Hammer Head HH3 computer which may be obtained from Walkabout Computers, Inc. of Palm Beach, Fla.

Figure 7:
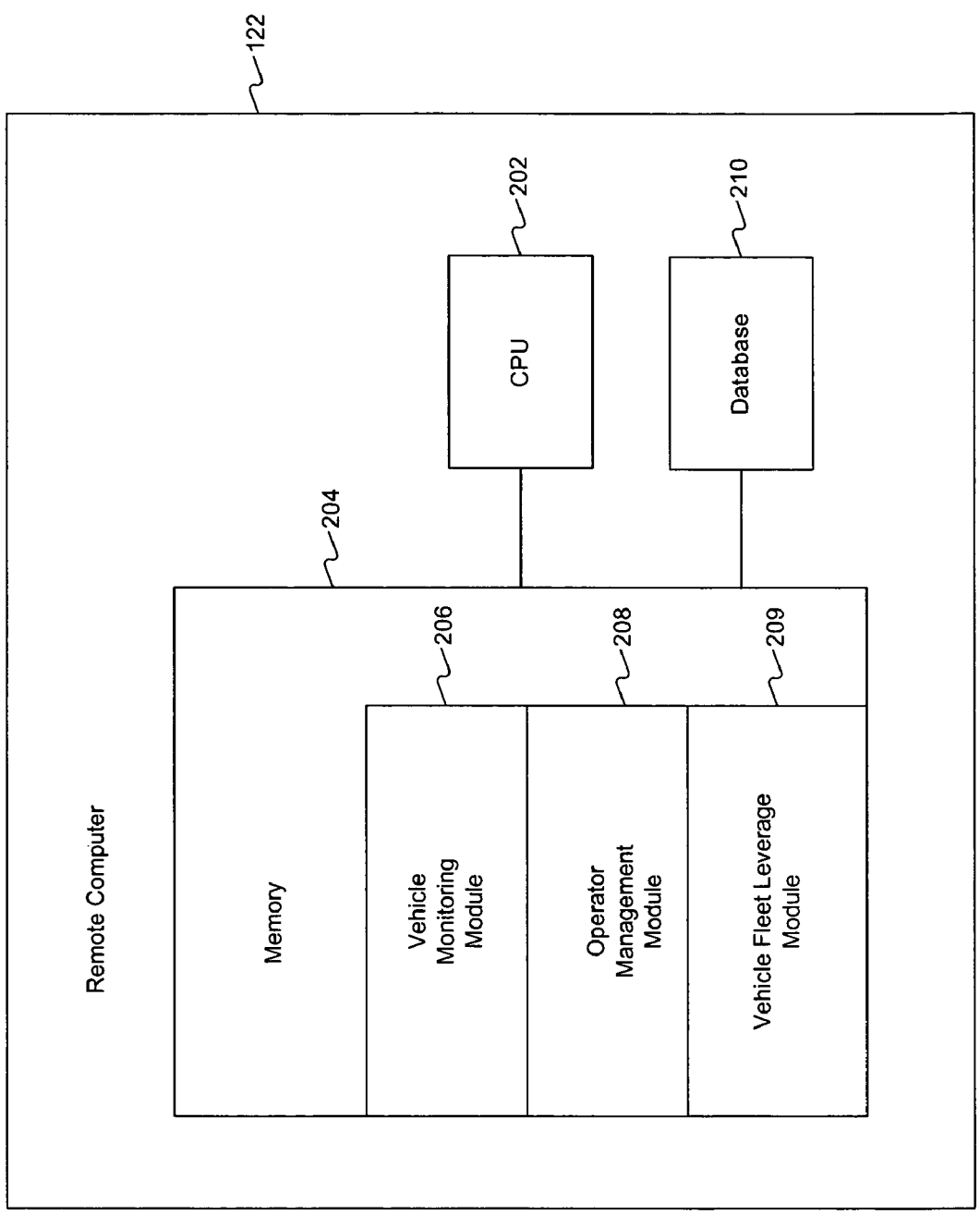
FIG. 7 shows a block diagram of an exemplary remote computer, consistent with the systems and methods of the present invention.

Referring now to FIG. 7, there is shown a block diagram of an exemplary remote computer 200 consistent with the systems and methods of the present invention. In one embodiment, remote computer 200 may be a common resource that could be shared by intelligent vehicle subsystems associated with intelligent vehicles 102, 104, . . . and 110. By way of a non-limiting example, as shown in FIG. 7, remote computer 200 may include a CPU 202, a memory 204, and a database 210. Memory 204 may include a vehicle monitoring module 206, an operator management module 208, and a vehicle fleet leverage module 209, which when executed by CPU 202 may provide at least some of the functionality associated with remote computer 200. Vehicle monitoring module 206 may contain instructions for providing functionality associated with monitoring various vehicles having the intelligent vehicle subsystems. Operator management module 208 may contain instructions for providing functionality associated with various user related functions, such as providing time/attendance information processing. Vehicle fleet leverage module 209 may contain instructions for providing functionality associated with various applications associated with leveraging the vehicle fleet, such as methods and systems for acquiring address information using a vehicle. One skilled in the art will appreciate that vehicle monitoring module 206, operator management module 208, and vehicle fleet leverage module 209 may be implemented using any suitable programming language and environment. One skilled in the art will appreciate that components of vehicle monitoring module 206, operator management module 208, and vehicle fleet leverage module 209 may reside on remote computer 200, other servers or computers, or on user terminals, such as user terminal 122. Further, other metadata, such as business intelligence and data modeling tools, packaged applications, and messaging technologies may also be accessed by the various modules, which may be stored in database 210. One skilled in the art will appreciate that database 210 is exemplary and relevant data may be stored in other databases, which may be located on other computers, servers, or user terminals.

Further, various application program interfaces (APIs), such as the Windows API, may be used along with modules associated with user terminal 122 and remote computer 200 to perform various functions associated with the systems and methods corresponding to the embodiments of the present invention. One skilled in the art will appreciate that other types of APIS, such as Java APIs, may be used with the embodiments of the present invention, including for example, remote procedure calls, structured query language commands, file transfer commands, and/or message delivery commands. Of course, APIs may be used alone or in conjunction with other technologies, such as Common Object Request Broker Architecture, Component Object Model, and/or Distributed Computing Environment.

As shown in FIG. 7, database 210 of remote computer 200 may be used to store various data and information for systems and methods consistent with the present invention. Although FIG. 7 shows database 210 as part of remote computer 200, one skilled in the art will appreciate that database 210 may be remotely located. Database 210 may be a distributed database such that some or all components of database 210 may reside on other computers. In one embodiment, database 210 may include various tables containing information, such as an exemplary maintenance information table 800 shown in FIG. 8.

Referring now to FIG. 8, maintenance information table 800 may contain at least a portion of vehicle component status data for a vehicle acquired using information collection devices 120, for example. By way of a non-limiting example, maintenance information table 800 may include columns corresponding to a vehicle ID 802, a tire pressure 804, an engine information 806, a vehicle fluid information 808, and a maintenance schedule 810.

Vehicle ID 802 may serve as an identification for a vehicle being used as part of systems and methods of the present invention. Vehicle ID 802 may be a human readable number, alphanumeric string, or a computer code. In one embodiment, vehicle ID 802 may also include information concerning a RFID tag associated with a particular vehicle, for example.

Tire pressure 804 may include tire pressure data acquired using tire pressure sensor 156 (FIG. 3). Tire pressure data may be stored by tire position based on the tire pressure of the relevant tire.

Engine information 806 may include data concerning the performance of the engine as obtained by engine information sensor 158, for example.

Vehicle fluid information 808 may include fluid level data obtained using vehicle fluid information sensor 160, for example. One skilled in the art will appreciate that various fluid levels may be measured using different sensors.

Maintenance schedule 810 may include information concerning any scheduled maintenance for a vehicle. In one embodiment, table 800 may only include that information which needs action. Thus, for example, tire pressure 804 may only be stored when it exceeds a predetermined limit for a particular vehicle. In one embodiment, information acquisition module 176 may determine when an acquired tire pressure reading exceeds a particular threshold and at that point that data may then be automatically transmitted by information acquisition module 176, alone or in combination with other components, to remote computer 200, which may then store that data in maintenance information table 800. Although FIG. 8 shows only a limited number of columns and corresponding rows in maintenance information table 800, database 210 may contain several such tables, which may have additional columns and rows.

Referring now to FIG. 9, database 210 in one embodiment, may also include an operator management table 900. Operator management table 900 may include information helping an user of the vehicle perform most of the operational functions from the vehicle, without having to visit a brick-and-mortar office building. Thus, for example, an user of a vehicle (e.g., vehicle 102 of FIG. 1) may, by using user terminal 122, access information stored in operator management table 900 to perform functions, such as entering time/attendance data, obtaining instructions with respect to route changes and receiving other information. By way of a non-limiting example, operator management table 900 may include a vehicle ID 902, an employee ID 904, a date 906, a begin time 908, an end time 910, and a route 912.

Vehicle ID 902 may serve as an identification for a vehicle being used as part of systems and methods of the present invention. Vehicle ID 902 may be a human readable number, alphanumeric string, or a computer code. In one embodiment, vehicle ID 902 may also include information concerning a RFID tag associated with a particular vehicle, for example. Employee ID 904 may be used to identify an user of the vehicle, for example. Employee ID 904 may be a human readable number, alphanumeric string, or a computer code. Date 906 may include a date entry corresponding to a day on which an user may have worked, for example. Begin time 908 and end time 910 may include time entries corresponding to the user's schedule for that day. Route 912 may include information or code corresponding to a route that the user of the vehicle may be required to complete on a particular day, for example. Although FIG. 9 shows only a limited number of columns and corresponding rows in operator management table 900, database 210 may contain several such tables, which may have additional columns and rows.

Referring now to FIG. 10, database 210, in one embodiment, may further include a vehicle fleet leverage table 1000. Vehicle fleet leverage table 1000 may include information acquired and aggregated from a plurality of vehicles which may then have application in other areas, such as navigation, marketing, and/or in delivering other products and services. By way of a non-limiting example, vehicle fleet leverage table 1000 may include a location ID 1002, a street address 1004, a location information 1006, a zip code 1008, a city 1010, and a RFID tag 1012 associated with a fixed reference point, such as a mailbox, associated with a particular street address, for example.

Figure 11:
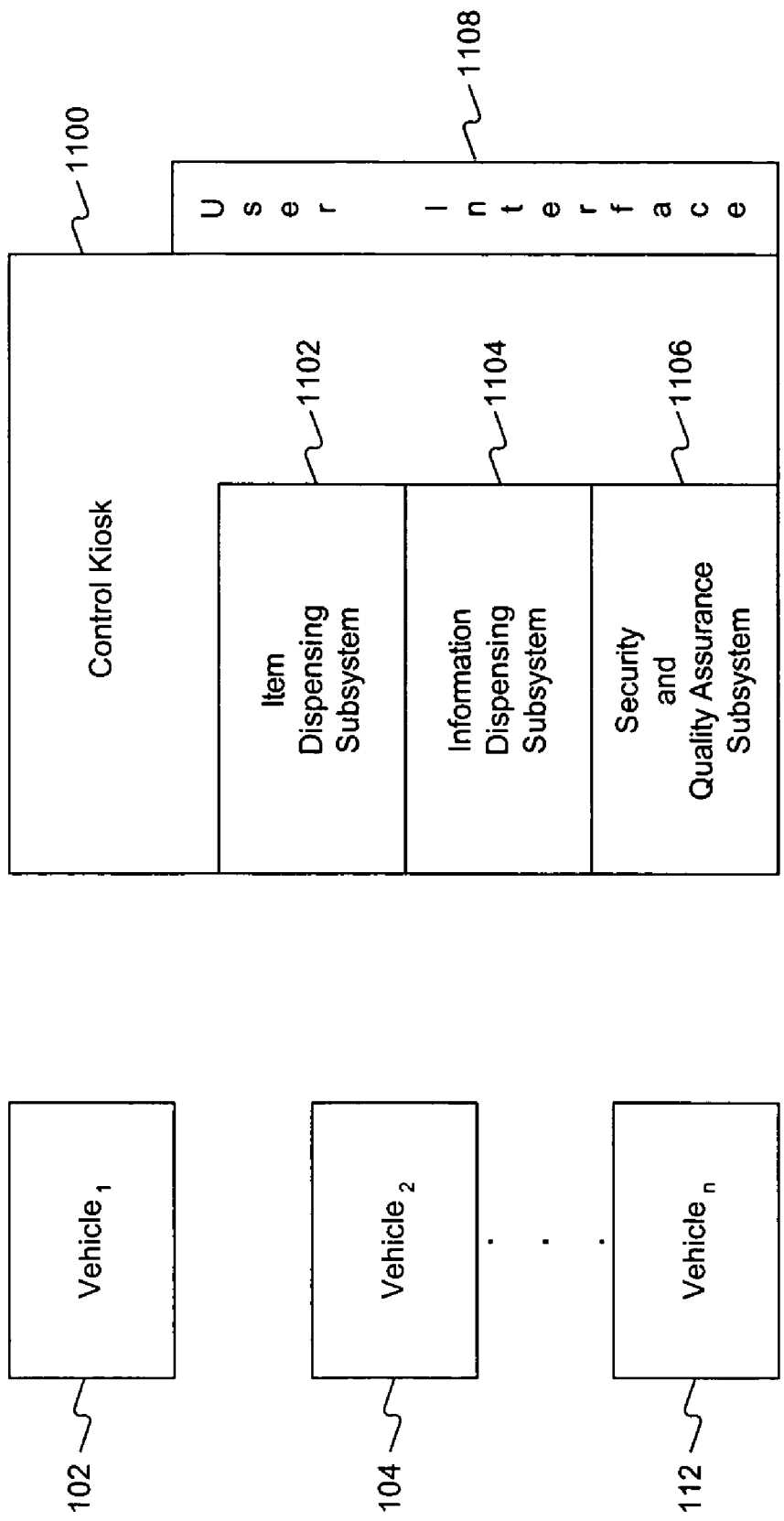
FIG. 11 shows a block diagram of a vehicle fleet and an exemplary control kiosk, consistent with the systems and methods of the present invention.

Referring now to FIG. 11, there is shown a block diagram of a intelligent vehicle fleet, including intelligent vehicle$_1$ 102, intelligent vehicle$_2$ 104, . . . and intelligent vehicle$_n$ 112, and an exemplary control kiosk 1100 for work flow management, consistent with the systems and methods of the present invention. An user of a vehicle may both walk up or drive up to control kiosk 1100 to perform various administrative and work related functions. In one embodiment, control kiosk 1100 may include an item dispensing subsystem 1102, an information dispensing subsystem 1104, and a security and quality assurance subsystem 1106. Item dispensing subsystem 1102 may include functionality for storing and dispensing items, such as keys for vehicles. One skilled in the art will appreciate that robotic technology and/or other technologies may be used to accomplish dispensing of items, such as keys. Information dispensing subsystem 1104 may include functionality for interfacing with remote computer 200, for example, and accessing any special instructions and/or route information for the user of the vehicle. Information dispensing subsystem 1104 may be implemented using a computing and communication platform, such as user terminal 122 and/or remote computer 200. Security and quality assurance subsystem 1106 may provide functionality such as identifying an user of the vehicle using any appropriate identification technique (e.g., finger print identification, iris identification, and/or a user/password combination). Security and quality assurance subsystem 1106 may also include a tag reader, such as an RFID tag reader, which could read an RFID tag associated with the user and/or the vehicle being driven by the user. Indeed, other sensors and technologies may also be used to automate identification of the user and/or the vehicle. Security and quality assurance subsystem 1106 may also include interface to a camera (described below) for acquiring images of the user or the vehicle, which may further be used for either identification and authentication or for quality assurance. Quality assurance may include ensuring, for example, that the user of the vehicle has a crisp and clean uniform. One skilled in the art will appreciate that although FIG. 11 shows three subsystems, the functionality associated with these subsystems may be distributed into further subsystems or combined into fewer subsystems. By way of a non-limiting example, each of these subsystems may connect with user interface 1108 permitting the user of the vehicle to transact business with control kiosk 1100.

Figure 12:
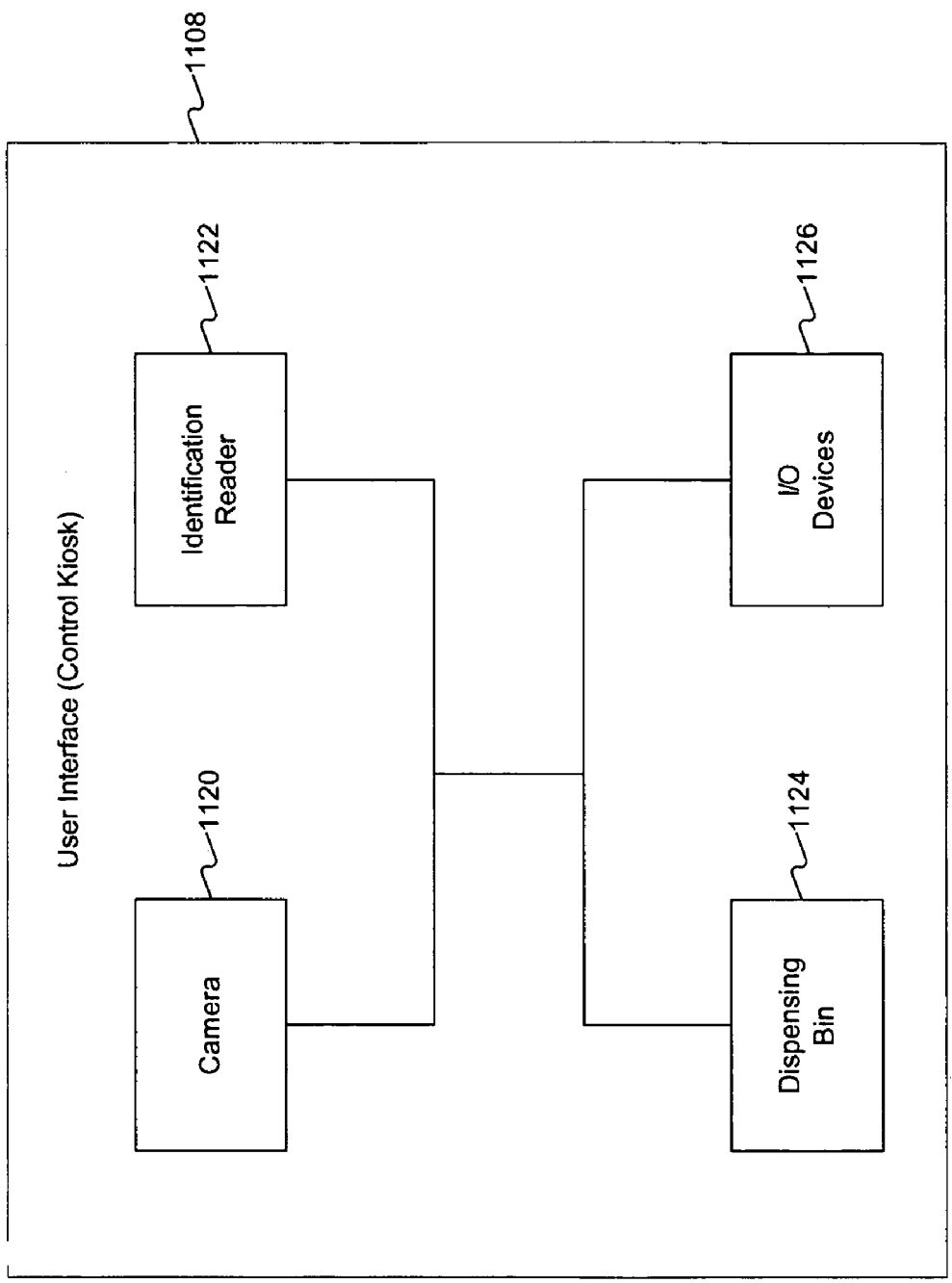
FIG. 12 shows a block diagram for an exemplary user interface associated with the exemplary control kiosk, consistent with the systems and methods of the present invention.

Referring now to FIG. 12, there is shown a block diagram for an exemplary user interface 1108 associated with the exemplary control kiosk 1100, consistent with the systems and methods of the present invention. User interface 1108 may include a camera 1120, an identification reader 1122, a dispensing bin 1124, and I/O devices 1126. Camera 1120 may be a still or a video camera, which may acquire an image upon detecting the presence of a person or a vehicle in the vicinity of user interface 1108. Camera 1120 may transmit the acquired information to security and quality assurance subsystem 1106, which may then perform security and quality assurance functions discussed above. Any appropriate identification reader, such as magnetic strip card readers and/or optical card readers may be used. The user of the vehicle may also be required to insert a card in reader 1122, which may read the contents of the card and transmit that information to security and quality assurance subsystem 1106. Dispensing bin 1124 may be used to hold any items, such as keys, that are being dispensed by control kiosk 1100. Dispensing bin 1124 may also serve as a receiving bin, such that an user of a vehicle may return keys or other items to dispensing bin 1124, which may then store them inside control kiosk 1100. I/O devices 1126 may include other input/output devices that may be used to provide or receive information from the user of the vehicle or from the vehicle itself. For example, I/O devices may include any of the devices identified in FIG. 5. Further, I/O devices 1126 may also include a scanner, such as an optical scanner, that may be used to scan any information that the user of the vehicle may have.

In one embodiment, subsystems located in control kiosk 1100 may communicate with user terminal 122 located in a vehicle using for example, a plug-in cable or a wireless interface. Subsystems located in control kiosk 1100 may also communicate with remote computer 200 and/or other information sources 300.

Figure 13:
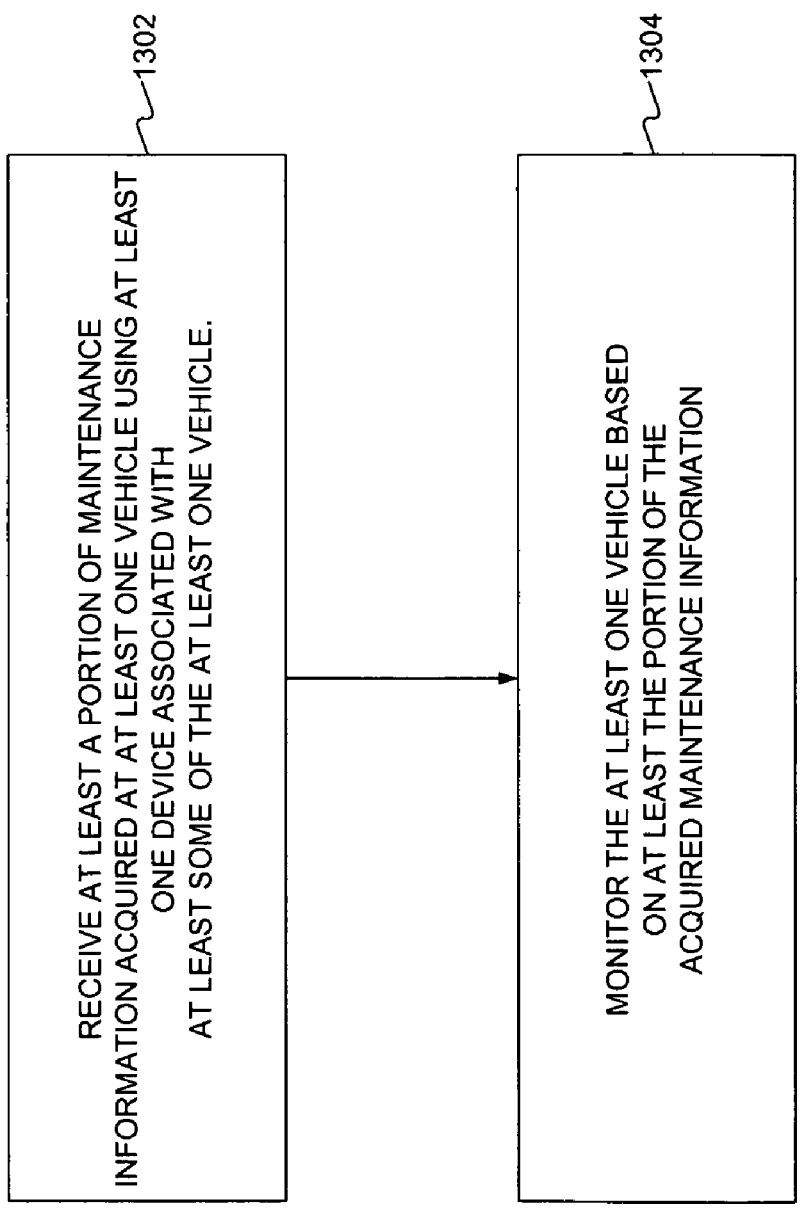
FIG. 13 is a flow diagram illustrating an exemplary method for managing vehicles, consistent with systems and methods of the present invention.

Referring now to FIG. 13, there is shown a flow diagram illustrating an exemplary method for managing vehicles, consistent with systems and methods of the present invention. In one embodiment, the method for managing vehicles may include receiving at a remote computer automatically-transmitted vehicle component status data or measurements from at least one vehicle (step 1302). As part of this step, intelligent vehicle subsystem 116 may acquire maintenance information including vehicle component status data corresponding to the vehicle in which it resides using information collection devices 120. Information acquisition module 176 may work with information collection devices 120 to perform this functionality. Further, information acquisition module 176 may transmit at least a portion of the acquired maintenance information to remote computer 200. Remote computer 200 may store the received portion of the acquired maintenance information in maintenance information table 800, for example.

The exemplary method may further include monitoring the plurality of vehicles based on at least the portion of the acquired maintenance information (step 1304). Remote computer 200 may, using vehicle monitoring module 206, for example, analyze the stored maintenance information to manage a replacement component inventory for the vehicles. Thus, for example, by detecting trends in part failure, remote computer 200 may help generate a better estimate of replacement components needed for repairing or maintaining the vehicles. Additionally, in one embodiment, remote computer 200, alone or in combination with other components, schedules maintenance activities for one or more vehicles based at least on the acquired maintenance information. For example, based on a particular deviation from accepted performance and/or a combination of such events, vehicle monitoring module 206 may schedule maintenance for any of the vehicles. A maintenance schedule may then be transmitted to user terminal 122 of the vehicle for which maintenance has been scheduled. An user may view this scheduled maintenance through user terminal 122. The user of the vehicle may then be required to have the scheduled maintenance activity performed before further delivery operations.

Figure 14:
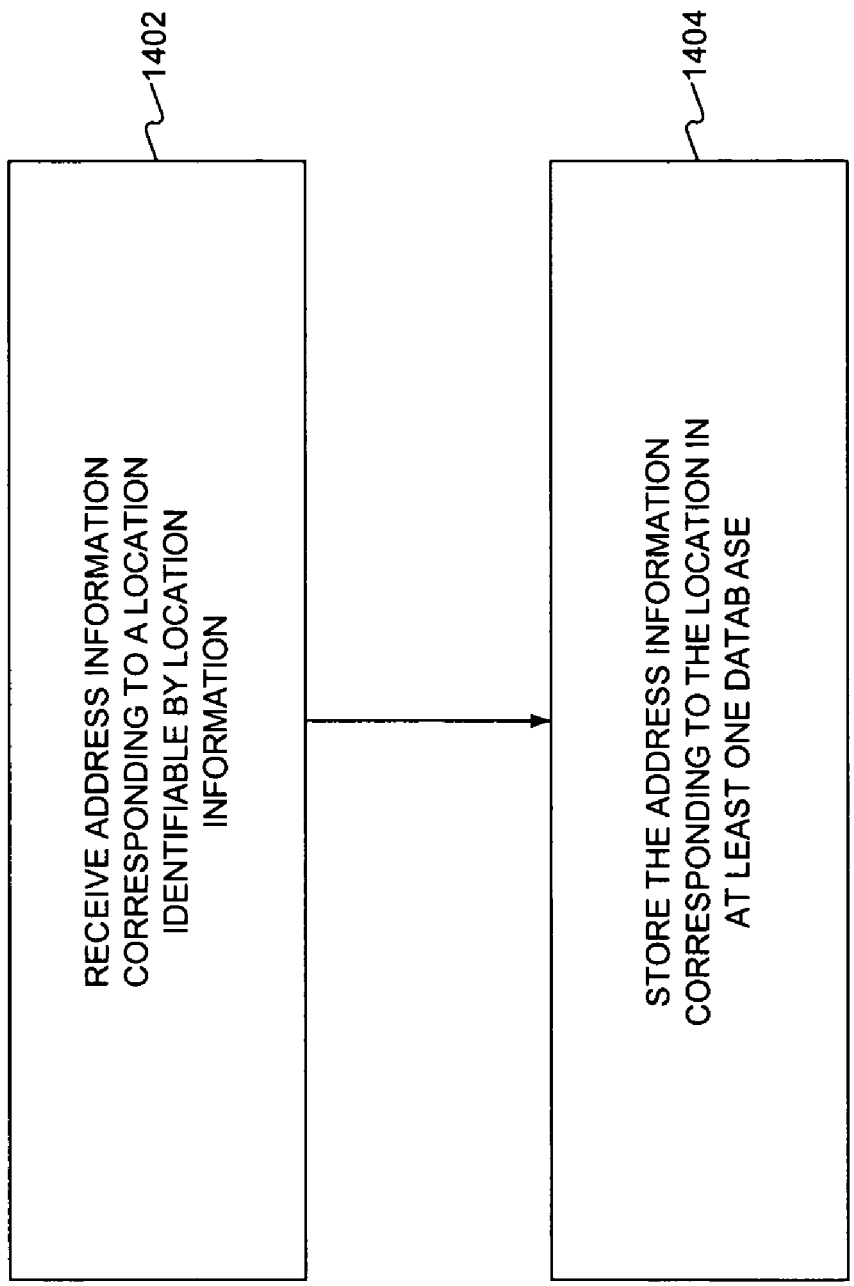
FIG. 14 is a flow diagram illustrating an exemplary method for acquiring address information using a vehicle, consistent with systems and methods of the present invention.

Referring now to FIG. 14, there is shown a flow diagram illustrating an exemplary method for acquiring address information using a vehicle. In one embodiment, the method for acquiring address information using a vehicle may include receiving address information corresponding to a location identifiable by location information (step 1402). Address information may be read using tag reader 152 (shown as part of information collection devices 120 in FIG. 3, for example) from an RFID tag attached to a reference point associated with an address, such as a mailbox. Alternatively, address information for a route for a vehicle may be stored in a database (not shown) associated with user terminal 122. Address information, as used herein, may include street address information, but is not so limited. In one embodiment, address information may be an index entry to a tag ID associated with a particular address. Thus, for example, tag reader 152 may acquire RFID tag 1012 information from a tag associated with the mailbox. The location information may relate to GPS coordinates for that particular location, which may be acquired using GPS device 154 (shown as part of information collection devices in FIG. 3, for example). Address information may be acquired on command and/or automatically for a route. Thus, the user of the vehicle may trigger acquisition of address information for a particular location along a particular route or may instruct intelligent vehicle subsystem 116 to acquire the address information for all addresses along a route or an area that the vehicle may cover as they become available due to the physical proximity of the vehicle to the RFID tag or other address ID transmitter.

In one embodiment, the address information corresponding to the location may next be stored in a database (step 1404). By way of a non-limiting example, address information may be stored in database 210, as part of vehicle fleet leverage table 1000, for example. The information stored in vehicle fleet leverage table 1000 may then be used to update an existing table (not shown) indicating the relationships between various addresses and their geographic position, as reflected by their GPS coordinates, for example. Thus, in one embodiment, acquired address and location information may be used to update or refine an existing location/address database.

Additional value-added services and methods may also be implemented. For example, containers for storing items to be delivered, such as, for example, mail "tubs," may be identified by reading RFID tags attached to them, and could be tracked by registering a drop of such a container at a particular location. Thus, for example, the user of the vehicle may command intelligent vehicle subsystem 116 to automatically transmit address information for any location where such a container is removed from the vehicle. In some embodiments, the address information and the fact that the mail tub was dropped may be automatically recorded when tag reader 152 may detect the absence of a signal from a tag associated with the container.

Other examples may relate to tracking the workload of the user. For example, containers as described above, may also be used to track the volume of work an user performs. Each day, a tag reader or other information collection device of the intelligent vehicle subsystem 116 may record the RFIDs for the containers that might have been loaded into the vehicle or taken off the vehicle and may transmit the data to the user terminal 122. The container movement may then be used to determine the workload for the user of the vehicle. Alternatively and/or additionally, individual items to be delivered, such as, envelopes, parcels, and heavy items, may also be identified by placing RFID tags on them, for example. Thus, a vehicle equipped with intelligent vehicle subsystem 116 may track the number of items to be delivered that were loaded into the vehicle and also the number of items to be delivered that were taken off the vehicle in a given time period. Further, in another embodiment, items to be delivered may each be categorized into various categories, such as envelopes, packages, and/or heavy items. Tags associated with the items to be delivered may provide the item category information to intelligent vehicle subsystem 116, which may keep track of a rate of flow of such items to be delivered through the vehicle. The rate of flow or any other such variable may then be used to determine the workload for the mail carrier or other delivery personnel associated with that particular vehicle.

Other embodiments of the invention will be apparent to those skilled in the art from consideration of the specification and practice of the invention disclosed herein. It is intended that the specification and examples be considered as exemplary only.

What is claimed is:

1. An intelligent vehicle subsystem for a vehicle, comprising:
   a reading device configured to acquire address information from a tag attached to a reference point associated with a location;
   a scanning device configured to scan information coded on one or more items to be delivered that were loaded onto the vehicle at the location;
   a tag reader configured to read information contained in tags associated with containers for storing the one or more items to be delivered;
   a global positioning sensor configured to determine a location of the vehicle; and
   a user terminal configured to communicate with a remote computer at least one of the information coded on the one or more items to be delivered, at least a portion of the information contained in tags associated with the containers storing the one or more items to be delivered, or a location of the vehicle.

2. The intelligent vehicle subsystem of claim 1, wherein the scanning device is a handheld scanner.

3. The intelligent vehicle subsystem of claim 1 further comprising a maintenance module configured to acquire maintenance information concerning the status of at least one component of the vehicle.

4. The intelligent vehicle subsystem of claim 3, wherein the user terminal is further configured to automatically transmit to a remote computer maintenance information concerning the status of the at least one component of the vehicle.

5. The intelligent vehicle subsystem of claim 1, wherein the user terminal is further configured to communicate with a remote computer time and attendance information concerning at least one vehicle user.

6. The intelligent vehicle subsystem of claim 1, wherein the tag attached to the reference point is an RFID tag.

7. The intelligent vehicle subsystem of claim 1, wherein the reference point associated with the address is a mailbox.

8. The intelligent vehicle subsystem of claim 1, further comprising:

a transmitting device configured to transmit address information for a location where one of the containers is unloaded from the vehicle.

9. An intelligent vehicle subsystem for a vehicle, comprising:
- a reading device configured to acquire address information from a tag attached to a reference point associated with a location;
- a mail scanner configured to scan information coded on one or more mail pieces that were loaded onto the vehicle at the location;
- a tag reader configured to read information contained in tags associated with mail containers;
- a global positioning sensor configured to determine a location of the vehicle; and
- a user terminal configured to communicate with a remote computer at least one of the information coded on the one or more mail pieces, at least a portion of the information contained in tags associated with the mail containers, or a location of the vehicle.

10. The intelligent vehicle subsystem of claim 9, wherein the mail scanner is a handheld scanner.

11. The intelligent vehicle subsystem of claim 9 further comprising a maintenance module configured to acquire maintenance information concerning at least one component of the vehicle.

12. The intelligent vehicle subsystem of claim 11, wherein the user terminal is further configured to communicate with a remote computer maintenance information concerning the at least one component of the vehicle.

13. The intelligent vehicle subsystem of claim 9, wherein the user terminal is further configured to communicate with a remote computer time and attendance information concerning at least one mail carrier.

14. The intelligent vehicle subsystem of claim 9, wherein the tag attached to the reference point is an RFID tag.

15. The intelligent vehicle subsystem of claim 9, wherein the reference point associated with the address is a mailbox.

16. The intelligent vehicle subsystem of claim 9, further comprising:
- a transmitting device configured to transmit address information for a location where one of the containers is unloaded from the vehicle.

17. A system of intelligent delivery vehicles, comprising:
one or more delivery vehicles;
- a reading device configured to acquire address information from a tag attached to a reference point associated with a location;
- a scanning device configured to scan information coded on one or more items to be delivered that were loaded onto the vehicle at the location;
- a tag reader configured to read information contained in tags associated with containers for storing items to be delivered;
- a global positioning sensor configured to determine a location of the delivery vehicle;
- at least one remote computer comprising a database to store communicated information; and
- a user terminal configured to communicate with the at least one remote computer at least one of the information coded on the one or more items to be delivered, at least a portion of the information contained in tags associated with the containers for storing the one or more items to be delivered, or a location of the one or more delivery vehicles.

18. The system of claim 17 further comprising:
information collection devices installed in at least one delivery vehicle and configured to communicate vehicle component status data to the user terminal in the delivery vehicle in which they are installed; and
the remote computer comprises a maintenance information table in which to store vehicle component status data that may be communicated from the user terminal.

19. The system of intelligent delivery vehicles of claim 17, wherein the tag attached to the reference point is an RFID tag.

20. The system of intelligent delivery vehicles of claim 17, wherein the reference point associated with the address is a mailbox.

21. The system of intelligent delivery vehicles of claim 17, further comprising:
- a transmitting device configured to transmit address information for a location where one of the containers is unloaded from one of the one or more delivery vehicles.

22. An intelligent vehicle subsystem for a vehicle, comprising:
- a reading device configured to acquire address information from a tag attached to a reference point associated with a location;
- a scanning device configured to scan information coded on one or more items to be delivered that were loaded onto the vehicle at the location;
- a tag reader configured to read information contained in tags associated with containers for storing the one or more items to be delivered; and
- a global positioning sensor configured to determine a location of the vehicle.

* * * * *